US009835785B2

(12) United States Patent
Roh et al.

(10) Patent No.: US 9,835,785 B2
(45) Date of Patent: Dec. 5, 2017

(54) OPTICAL MEMBER, DISPLAY DEVICE HAVING THE SAME, AND METHOD OF FABRICATING THE SAME

(75) Inventors: June Roh, Seoul (KR); Kyung Jin Kim, Seoul (KR); Ja Ram Kim, Seoul (KR); Jae Hong Lee, Seoul (KR); Soon Young Hyun, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 3 days.

(21) Appl. No.: 14/233,860

(22) PCT Filed: Jun. 11, 2012

(86) PCT No.: PCT/KR2012/004610
§ 371 (c)(1),
(2), (4) Date: Jan. 20, 2014

(87) PCT Pub. No.: WO2013/012171
PCT Pub. Date: Jan. 24, 2013

(65) Prior Publication Data
US 2014/0133129 A1 May 15, 2014

(30) Foreign Application Priority Data
Jul. 18, 2011 (KR) .................. 10-2011-0071141

(51) Int. Cl.
*F21V 9/16* (2006.01)
*F21V 8/00* (2006.01)
(Continued)

(52) U.S. Cl.
CPC ............ *G02B 6/0026* (2013.01); *B82Y 20/00* (2013.01); *F21V 9/16* (2013.01); *G02B 6/0023* (2013.01);
(Continued)

(58) Field of Classification Search
CPC ... G02F 1/133609; G02F 2001/133614; F21V 9/16; B82Y 20/00; G02B 6/0026;
(Continued)

(56) References Cited

U.S. PATENT DOCUMENTS 5,998,925 A 12/1999 Shimizu et al.
7,004,610 B2 2/2006 Yamashita et al.
(Continued)

FOREIGN PATENT DOCUMENTS

CN 1758114 A 4/2006
CN 1869788 A 11/2006
(Continued)

OTHER PUBLICATIONS

Office Action dated Jun. 24, 2014, in Taiwanese Application No. 101122681.
(Continued)

*Primary Examiner* — Ali Alavi
(74) *Attorney, Agent, or Firm* — Saliwanchik, Lloyd & Eisenschenk (57) ABSTRACT

Disclosed are an optical member, a display device having the same, and a method of fabricating the same. The optical member includes a receiving part having an empty space therein, a host in the receiving part, a plurality of wavelength conversion particles in the host, a sealing part in the receiving part, and a pre-treatment layer between the sealing part and an inner surface of the receiving part.

20 Claims, 8 Drawing Sheets

(51) Int. Cl.
   *B82Y 20/00* (2011.01)
   *G02F 1/1335* (2006.01)
(52) U.S. Cl.
   CPC ...... *G02F 1/133609* (2013.01); *G02B 6/0085* (2013.01); *G02F 2001/133614* (2013.01)
(58) Field of Classification Search
   CPC ....... G02B 6/0023; G02B 6/0085; F21K 9/56; G03B 21/204; H01L 33/502
   USPC .................................................. 362/84, 317
   See application file for complete search history.

(56) References Cited

U.S. PATENT DOCUMENTS

| | | | |
|---|---|---|---|
| 7,040,774 B2 | 5/2006 | Beeson et al. | |
| 7,481,562 B2 | 1/2009 | Chua et al. | |
| 7,795,055 B2 | 9/2010 | Lee et al. | |
| 8,038,822 B2* | 10/2011 | Kindler | G02B 26/123 156/245 |
| 8,545,083 B2 | 10/2013 | Terajima et al. | |
| 9,110,200 B2 | 8/2015 | Nichol et al. | |
| 9,244,209 B2 | 1/2016 | Lee et al. | |
| 9,304,355 B2 | 4/2016 | Lee | |
| 9,335,459 B2 | 5/2016 | Kang | |
| 2001/0001207 A1 | 5/2001 | Shimizu et al. | |
| 2002/0001055 A1 | 1/2002 | Kimura et al. | |
| 2002/0071071 A1 | 6/2002 | Sekiguchi et al. | |
| 2003/0066998 A1* | 4/2003 | Lee | B82Y 10/00 257/19 |
| 2003/0165781 A1 | 9/2003 | Takeda | |
| 2004/0046242 A1 | 3/2004 | Asakawa | |
| 2004/0190279 A1 | 9/2004 | Kitamura | |
| 2005/0001225 A1 | 1/2005 | Yoshimura et al. | |
| 2005/0221519 A1 | 10/2005 | Leung et al. | |
| 2006/0002101 A1 | 1/2006 | Wheatley et al. | |
| 2006/0034084 A1 | 2/2006 | Matsuura et al. | |
| 2006/0034579 A1 | 2/2006 | Sugiura | |
| 2006/0072315 A1 | 4/2006 | Han et al. | |
| 2006/0092666 A1 | 5/2006 | Jeong et al. | |
| 2006/0132034 A1* | 6/2006 | Cho et al. | 313/512 |
| 2006/0227532 A1 | 10/2006 | Ko et al. | |
| 2006/0227570 A1 | 10/2006 | Rutherford et al. | |
| 2006/0268537 A1* | 11/2006 | Kurihara | G02B 6/0023 362/34 |
| 2006/0268579 A1 | 11/2006 | Han et al. | |
| 2007/0004195 A1 | 1/2007 | Park et al. | |
| 2007/0012940 A1 | 1/2007 | Suh et al. | |
| 2007/0176196 A1 | 8/2007 | Kim et al. | |
| 2007/0210326 A1 | 9/2007 | Kurihara | |
| 2007/0221865 A1 | 9/2007 | Sohn et al. | |
| 2007/0221866 A1 | 9/2007 | Sohn et al. | |
| 2007/0221943 A1 | 9/2007 | Moriya et al. | |
| 2007/0228390 A1 | 10/2007 | Hattori et al. | |
| 2007/0229736 A1 | 10/2007 | Wang et al. | |
| 2007/0263408 A1 | 11/2007 | Chua | |
| 2008/0037272 A1 | 2/2008 | Song et al. | |
| 2008/0112186 A1 | 5/2008 | Jung et al. | |
| 2008/0237540 A1 | 10/2008 | Dubrow | |
| 2008/0284316 A1 | 11/2008 | Kurihara et al. | |
| 2009/0014688 A1 | 1/2009 | Hoshino et al. | |
| 2009/0021148 A1 | 1/2009 | Hachiya et al. | |
| 2009/0034292 A1 | 2/2009 | Pokrovskiy et al. | |
| 2009/0040598 A1 | 2/2009 | Ito | |
| 2009/0115936 A1 | 5/2009 | Takeuchi et al. | |
| 2009/0147497 A1 | 6/2009 | Nada | |
| 2009/0152567 A1 | 6/2009 | Comerford et al. | |
| 2009/0173957 A1 | 7/2009 | Brunner et al. | |
| 2009/0231847 A1 | 9/2009 | Pan et al. | |
| 2010/0051898 A1 | 3/2010 | Kim, II et al. | |
| 2010/0079901 A1 | 4/2010 | Fukushima | |
| 2010/0103648 A1 | 4/2010 | Kim et al. | |
| 2010/0110728 A1 | 5/2010 | Dubrow et al. | |
| 2010/0155749 A1 | 6/2010 | Chen et al. | |
| 2010/0164364 A1 | 7/2010 | Eida et al. | |
| 2010/0187975 A1 | 7/2010 | Tsukahara et al. | |
| 2010/0232133 A1 | 9/2010 | Tran et al. | |
| 2010/0232134 A1 | 9/2010 | Tran | |
| 2010/0283072 A1 | 11/2010 | Kazlas et al. | |
| 2010/0295438 A1 | 11/2010 | Ott et al. | |
| 2010/0302493 A1 | 12/2010 | Yang et al. | |
| 2010/0315320 A1 | 12/2010 | Yoshida | |
| 2011/0002140 A1 | 1/2011 | Tsukahara et al. | |
| 2011/0037926 A1 | 2/2011 | Tsukahara et al. | |
| 2011/0044046 A1 | 2/2011 | Abu-Ageel | |
| 2011/0090696 A1 | 4/2011 | Nagai et al. | |
| 2011/0141769 A1* | 6/2011 | Lee et al. | 362/629 |
| 2011/0156575 A1 | 6/2011 | Yu et al. | |
| 2011/0176328 A1 | 7/2011 | Anandan et al. | |
| 2011/0205750 A1 | 8/2011 | Krijn et al. | |
| 2011/0249424 A1 | 10/2011 | Joo et al. | |
| 2011/0261303 A1 | 10/2011 | Jang et al. | |
| 2011/0299011 A1 | 12/2011 | Weiss et al. | |
| 2012/0106197 A1 | 5/2012 | Lai et al. | |
| 2012/0113672 A1 | 5/2012 | Dubrow et al. | |
| 2012/0170282 A1 | 7/2012 | Lin et al. | |
| 2013/0128548 A1 | 5/2013 | Lin | |
| 2014/0049826 A1 | 2/2014 | Lee et al. | |
| 2014/0153218 A1 | 6/2014 | Hyun | |
| 2014/0160789 A1 | 6/2014 | Park | |
| 2014/0168571 A1 | 6/2014 | Hyun | |
| 2015/0369993 A1 | 12/2015 | Kim et al. | |

FOREIGN PATENT DOCUMENTS

| | | |
|---|---|---|
| CN | 1880839 A | 12/2006 |
| CN | 1881034 A | 12/2006 |
| EP | 2068193 A2 | 6/2009 |
| JP | 09073807 A | 3/1997 |
| JP | 2004303441 A | 10/2004 |
| JP | 2004315661 A | 11/2004 |
| JP | 2007005098 A | 1/2007 |
| JP | 2007173754 A | 7/2007 |
| JP | 2008287073 A | 11/2008 |
| JP | 2008311234 A | 12/2008 |
| JP | 2009200534 A | 9/2009 |
| JP | 2010123918 A | 6/2010 |
| KR | 20060056834 A | 5/2006 |
| KR | 20060125535 A | 12/2006 |
| KR | 20060129835 A | 12/2006 |
| KR | 20070092440 A | 9/2007 |
| KR | 20080007247 A | 1/2008 |
| KR | 20080063986 A | 7/2008 |
| KR | 10-2009-0021912 A | 3/2009 |
| KR | 10-2010-0027892 A | 3/2010 |
| KR | 20100024420 A | 3/2010 |
| KR | 10-2010-0046698 A | 5/2010 |
| KR | 20100047841 A | 5/2010 |
| KR | 20100118557 A | 11/2010 |
| KR | 20100129030 A | 12/2010 |
| KR | 20110012246 A | 2/2011 |
| KR | 20110068110 A | 6/2011 |
| KR | 20120001387 A | 1/2012 |
| KR | 10-2012-0070449 A | 6/2012 |
| KR | 10-2013-0009022 A | 1/2013 |
| TW | 2004-09384 | 6/2004 |
| TW | 200702822 | 1/2007 |
| TW | 200739192 | 10/2007 |
| TW | 200803600 A | 1/2008 |
| TW | 200848809 A | 12/2008 |
| TW | 201035484 A | 10/2010 |
| TW | 201041191 A | 11/2010 |
| TW | 201044067 A | 12/2010 |
| TW | 201105767 A | 2/2011 |
| WO | WO-2012144720 A1 | 10/2012 |

OTHER PUBLICATIONS

International Search Report in International Application No. PCT/KR2012/004610, filed Dec. 24, 2012.
European Search Report in European Application No. EP20120815508 filed May 28, 2014.

(56) References Cited

OTHER PUBLICATIONS

International Search Report in International Application No. PCT/KR2012/004625, dated Dec. 24, 2012.
Notice of Allowance dated Apr. 12, 2013 in Korean Application No. 10-2011-0071135.
European Search Report in European Application No. 12814589.3, dated Apr. 16, 2015.
Office Action dated Jun. 25, 2014 in Taiwanese Application No. 10-1121880.
Final Office Action dated Jul. 30, 2015 in U.S. Appl. No. 14/233,440.
European Search Report dated Sep. 7, 2015 in European Application No. 15172626.2.
International Search Report in International Application No. PCT/KR2012/004611, filed Jun. 11, 2012.
Taiwanese Office Action dated Jan. 23, 2015 in Taiwanese Application No. 101125849.
European Search Report dated Feb. 12, 2015 in International Application No. PCT/KR2012/004611.
International Search Report in International Application No. PCT/KR2012/004521, filed Jun. 8, 2012.
Office Action dated Dec. 3, 2014 in Taiwanese Application No. 101121510.
Office Action dated Dec. 24, 2012 in Korean Application No. 10-2011-0069797.
Office Action dated Aug. 18, 2015 in U.S. Appl. No. 14/232,843.
International Search Report in International Application No. PCT/KR2011/009232, filed Nov. 30, 2011.
Office Action dated Jul. 31, 2012 in Korean Application No. 10-2011-0009833.
Office Action dated Mar. 13, 2015 in U.S. Appl. No. 13/982,916.
Office Action dated Mar. 16, 2016 in U.S. Appl. No. 13/982,916.
International Search Report in International Application No. PCT/KR2012/006308, filed Aug. 8, 2012.
Office Action dated Jan. 28, 2016 in Chinese Application No. 201280066300.9.
Office Action dated Aug. 30, 2016 in U.S. Appl. No. 14/234,123.
Office Action dated Jun. 19, 2015 in U.S. Appl. No. 14/234,123.
Office Action dated Dec. 14, 2016 in U.S. Appl. No. 14/234,123.
Office Action dated Nov. 25, 2016 in U.S. Appl. No. 14/747,577.
Office Action dated Dec. 29, 2016 in U.S. Appl. No. 15/136,239.
Office Action dated Jul. 5, 2016 in U.S. Appl. No. 14/356,657.
Office Action dated Jan. 5, 2017 in U.S. Appl. No. 14/356,657.
European Search Report in European Application No. 12814403.7 dated Feb. 13, 2015.
International Search Report in International Application No. PCT/KR2012/005418, filed Jul. 9, 2012.
Office Action dated Apr. 6, 2016 in Taiwanese Application No. 101126235.
Office Action dated Jul. 6, 2015 in U.S. Appl. No. 14/234,117.
Office Action dated Jan. 21, 2016 in U.S. Appl. No. 14/234,117.
International Search Report in International Application No. PCT/KR2012/005353, filed Jul. 5, 2012.
European Search Report dated May 22, 2015 in European Application No. 12811675.3.
Office Action dated Jul. 6, 2015 in U.S. Appl. No. 14/232,850.
Office Action dated Jun. 1, 2016 in U.S. Appl. No. 14/232,850.
Notice of Allowance dated Nov. 17, 2016 in U.S. Appl. No. 14/232,850.

* cited by examiner

OPTICAL MEMBER, DISPLAY DEVICE HAVING THE SAME, AND METHOD OF FABRICATING THE SAME

CROSS-REFERENCE TO RELATED APPLICATIONS

This application is the U.S. national stage application of International Patent Application No. PCT/KR2012/004610, filed Jun. 11, 2012, which claims priority to Korean Application No. 10-2011-0071141, filed Jul. 18, 2011, the disclosures of each of which are incorporated herein by reference in their entirety.

TECHNICAL FIELD

The embodiment relates to an optical member, a display device having the same, and a method of fabricating the same.

BACKGROUND ART

Recently, flat display devices, such as an LCD (liquid crystal display), a PDA (plasma display panel) or an OLED (organic light emitting diode), have been increasingly developed instead of conventional CRTs (cathode ray tubes).

Among them, the LCD includes a liquid crystal display panel having a thin film transistor substrate, a color filter substrate and a liquid crystal injected between the thin film transistor substrate and the color filter substrate. Since the liquid crystal display panel is a non-emissive device, a backlight unit is provided below the thin film transistor substrate to supply light. Transmittance of the light emitted from the backlight unit is adjusted according to the alignment state of the liquid crystal.

The backlight unit is classified into an edge-illumination type backlight unit and a direct-illumination type backlight unit according to the position of a light source. According to the edge-illumination type backlight unit, the light source is located at a lateral side of a light guide plate.

The direct-illumination type backlight unit has been developed as the size of the LCD has become enlarged. According to the direct-illumination type backlight unit, at least one light source is located below the liquid crystal display panel to supply the light over the whole area of the liquid crystal display panel.

When comparing with the edge-illumination type backlight unit, the direct-illumination type backlight unit can employ a large number of light sources so that the high brightness can be achieved. In contrast, the direct-illumination type backlight unit must have thickness larger than thickness of the edge-illumination type backlight unit in order to ensure brightness uniformity.

In order to solve the above problem, a quantum dot bar having a plurality of quantum dots, which can convert blue light into red light or green light, is positioned in front of a blue LED that emits the blue light. Thus, as the blue light is irradiated onto the quantum dot bar, the blue light, the red light and the green light are mixed with each other by the quantum dots distributed in the quantum dot bar and the mixed light is incident into the light guide plate, so that white light is generated.

If the white light is supplied to the light guide plate by using the quantum dot bar, high color reproduction may be realized.

The backlight unit may include an FPCB (flexible printed circuit board) provided at one side of the blue LED, which generates blue light, to supply signals and power to the LED and a bonding member formed under the bottom surface of the FPCB.

The display device capable of displaying various images using the white light supplied to the light guide plate through the quantum dot bar as the blue light is emitted from the blue LED has been extensively used.

The display device employing the quantum dots is disclosed in Korean Unexamined Patent Publication No. 10-2011-0068110.

DISCLOSURE OF INVENTION

Technical Problem

The embodiment provides an optical member representing improved durability and improved reliability, a display device having the same, and a method of fabricating the same.

Solution to Problem

According to the embodiment, there is provided an optical member including a receiving part having an empty space therein, a host in the receiving part, a plurality of wavelength conversion particles in the host, a sealing part in the receiving part, and a pre-treatment layer between the sealing part and an inner surface of the receiving part.

According to the embodiment, there is provided an optical member including a receiving part having an empty space therein, a host in the receiving part, a plurality of wavelength conversion particles in the host, and a sealing part in the receiving part, An inner surface of the receiving part includes a first region corresponding to the sealing part and having a first surface characteristic, and a second region corresponding to the host and having a second surface characteristic.

According to the embodiment, there is provided a display device including a light source, a wavelength conversion member to receive a light output from the light source, and a display panel to receive a light output from the wavelength conversion member. The wavelength conversion member includes a receiving part having an empty space therein, a host in the receiving part, a plurality of wavelength conversion particles in the host, a sealing part in the receiving part, and a pre-treatment layer between the sealing part and an inner surface of the receiving part.

According to the embodiment, there is provided a display device including a light source, a wavelength conversion member to receive a light output from the light source, and a display panel to receive a light output from the wavelength conversion member. The wavelength conversion member includes a receiving part having an empty space therein, a host in the receiving part, a plurality of wavelength conversion particles in the host, and a sealing part in the receiving part. An inner surface of the receiving part includes a first region corresponding to the sealing part and having a first surface characteristic, and a second region corresponding to the host and having a second surface characteristic.

According to the embodiment, there is provided a method of fabricating an optical member. The method includes forming a pre-treatment layer having a first surface characteristic at a portion or an entire portion of a receiving part, forming a host in the receiving part and a plurality of wavelength conversion particles in the host, and forming a sealing part in the pre-treatment layer.

According to the embodiment, there is provided a method of fabricating an optical member. The method includes forming a first region having a first surface characteristic by performing surface treatment with respect to a portion of a receiving part, introducing a resin composition including a plurality of wavelength conversion particles into the receiving part, forming a host in the receiving part by curing the resin composition, and forming a sealing part in the first region.

Advantageous Effects of Invention

According to the optical member of the embodiment, the pre-treatment layer is formed in the receiving part or a portion of the surface of the receiving part is subject to the surface treatment. Therefore, a portion of the optical member according to the embodiment has a surface characteristic different from that of the host. In particular, the inlet of the receiving part may have a characteristic different from the host.

For example, if the host has hydrophilicity, a portion of the receiving part may have hydrophobicity. In addition, if the host has hydrophobicity, the inlet of the receiving part may have hydrophilicity.

Therefore, when the resin composition to form the host is injected into the receiving part, the inlet of the receiving part is not contaminated. Therefore, the sealing part can effectively seal the inlet of the receiving part. Accordingly, the sealing part and the receiving part can effectively protect the wavelength conversion particles from external moisture and/or oxygen.

Therefore, the optical member and the display device according to the embodiment can represent improved reliability and improved durability.

MODE FOR THE INVENTION

In the description of the embodiments, it will be understood that, when a substrate, a frame, a sheet, a layer, or a pattern is referred to as being "on" or "under" another substrate, another frame, another sheet, another layer, or another pattern, it can be "directly" or "indirectly" on the other substrate, frame, sheet, layer, or pattern, one or more intervening layers may also be present. Such a position of each element has been described with reference to the drawings. The thickness and size of each element shown in the drawings may be exaggerated, omitted or schematically drawn for the purpose of convenience or clarity. In addition, the size of elements does not utterly reflect an actual size.

Figure 1:
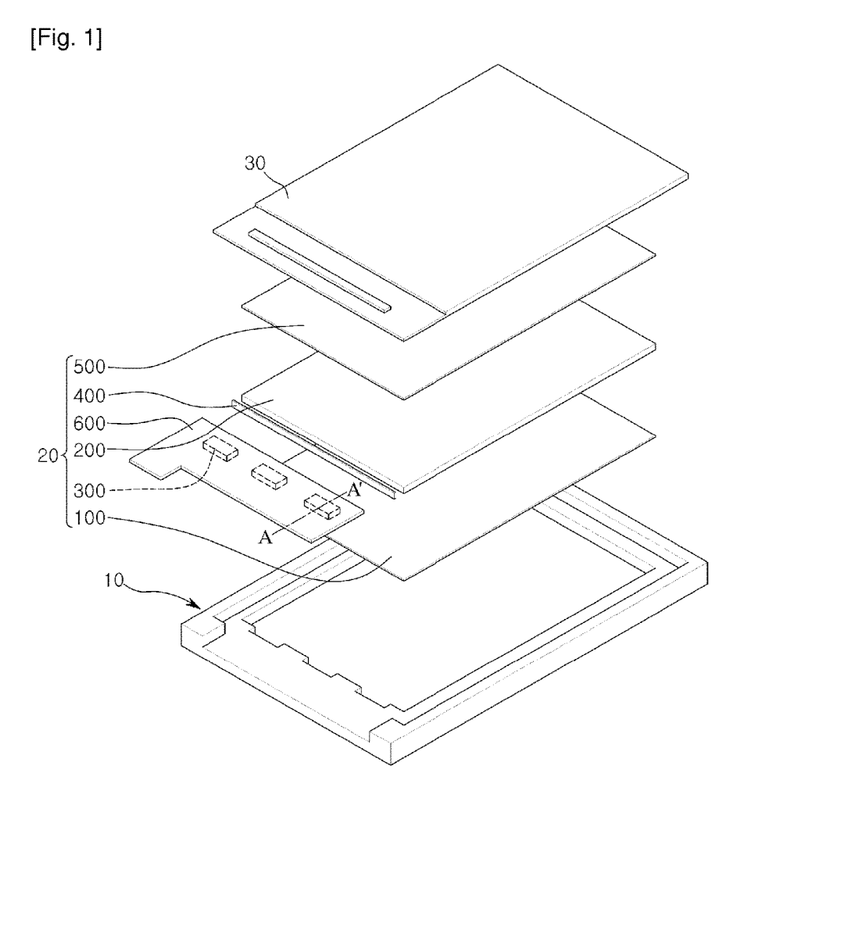
FIG. 1 is an exploded perspective view showing a liquid crystal display according to a first embodiment.
Figure 2:
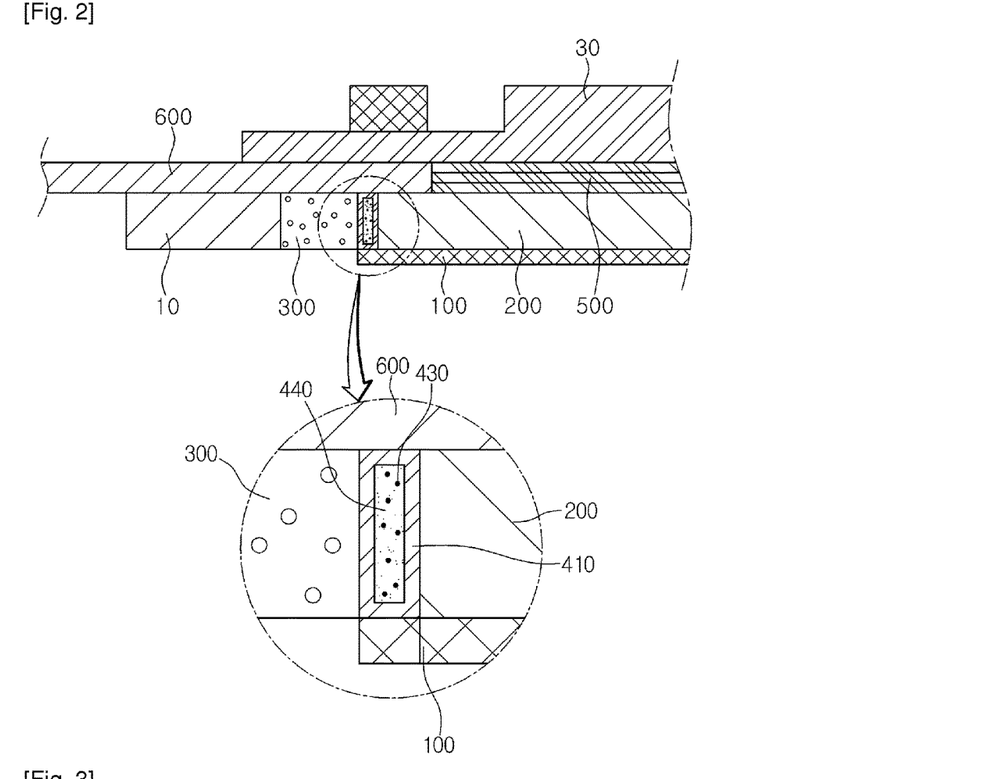
FIG. 2 is a sectional view taken along line A-A' of FIG. 1.
Figure 3:
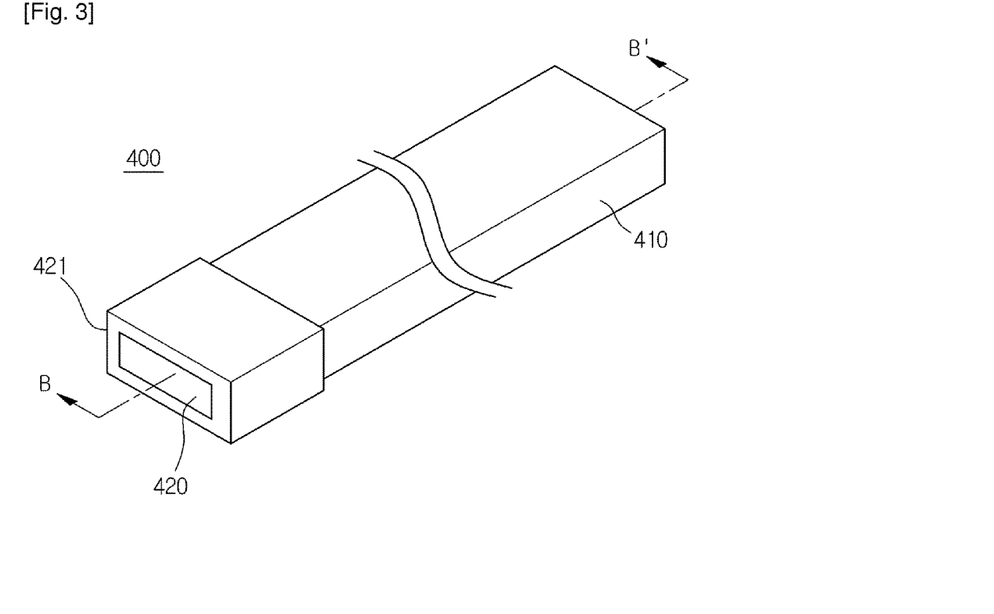
FIG. 3 is a perspective view showing a wavelength conversion member according to the first embodiment.
Figure 4:
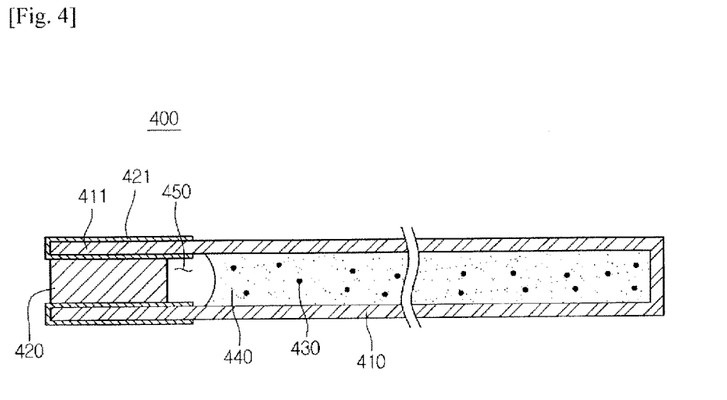
FIG. 4 is a sectional view taken along line B-B' of FIG. 3.
Figure 5:
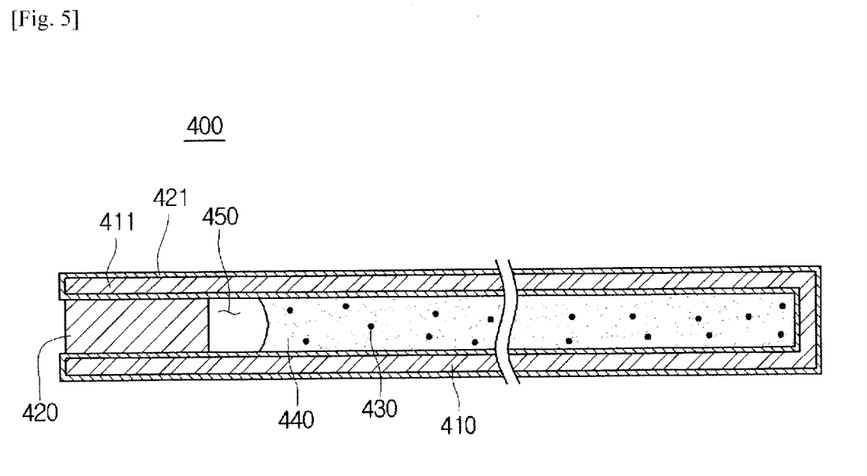
FIG. 5 is a sectional view showing another example of the wavelength conversion member.

FIG. 1 is an exploded perspective view showing a liquid crystal display according to a first embodiment, FIG. 2 is a sectional view taken along line A-A' of FIG. 1, and FIG. 3 is a perspective view showing a wavelength conversion member according to the first embodiment. FIG. 4 is a sectional view taken along line B-B' of FIG. 3, FIG. 5 is a sectional view showing another example of the wavelength conversion member, and FIGS. 6 to 11 are sectional views showing a method of fabricating the wavelength conversion member according to the embodiment.

Referring to FIGS. 1 to 4, a liquid crystal display (LCD) according to the embodiment includes a mold frame 10, a backlight unit 20 and a liquid crystal panel 30.

The mold frame 10 receives the backlight assembly 20 and the liquid crystal panel 30 therein. The mold frame 10 has a rectangular frame shape and may include plastic or reinforced plastic.

In addition, a chassis may be disposed below the mold frame 10. The chassis surrounds the mold frame 10 and supports the backlight assembly 20. The chassis may also be disposed at a lateral side of the mold frame 10.

The backlight assembly 20 is disposed in the mold frame 10. The backlight assembly 20 generates light to supply the light toward the liquid crystal panel 30. The backlight assembly 20 includes a reflective sheet 100, a light guide plate 200, light emitting diodes 300, a wavelength conversion member 400, a plurality of optical sheets 500, and a flexible printed circuit board (FPCB) 600.

The reflective sheet 100 reflects the light upward as the light is generated from the light emitting diodes 300.

The light guide plate 200 is disposed on the reflective sheet 100. The light guide plate 200 receives light output from the light emitting diode 300 and reflects the light upward by reflecting, refracting and scattering the light.

The light guide plate 200 includes an incident surface directed toward the light emitting diodes 300. From among lateral sides of the light guide plate 200, a lateral side directed toward the light emitting diodes 300 may serve as the incident surface.

The light emitting diodes 300 are disposed at the lateral side of the light guide plate 200. In detail, the light emitting diodes 300 are disposed at the incident surface.

The light emitting diodes 300 serve as a light source for generating the light. In detail, the light emitting diodes 300 emit the light toward the wavelength conversion member 400.

The light emitting diodes 300 may include a blue light emitting diode generating the blue light or a UV light emitting diode generating the UV light. In detail, the light emitting diodes 300 may emit the blue light having the wavelength band of about 430 nm to 470 nm or the UV light having the wavelength band of about 300 nm to 400 nm.

The light emitting diodes 300 are mounted on the FPCB 600. The light emitting diodes 300 can be disposed under the FPCB 600. The light emitting diodes 300 are driven by receiving a driving signal through the FPCB 600.

The light conversion member 400 is disposed between the light emitting diodes 300 and the light guide plate 200. The light conversion member 400 is bonded to the lateral side of the light guide plate 200. In detail, the light conversion member 400 is attached to the incident surface of the light guide plate 200. In addition, the wavelength conversion member 400 may be bonded to the light emitting diode 300.

The wavelength conversion member 400 receives the light from the light emitting diodes 300 to convert the wavelength of the light. For instance, the wavelength conversion member 400 can convert the blue light emitted from the light emitting diodes 300 into the green light and the red light. In detail, the wavelength conversion member 400 converts a part of the blue light into the green light having the wavelength in the range of about 520 nm to about 560 nm, and a part of the blue light into the red light having the wavelength in the range of about 630 nm to about 660 nm.

In addition, the wavelength conversion member 400 can convert the UV light emitted from the light emitting diodes 300 into the blue light, the green light and the red light. In detail, the wavelength conversion member 400 converts a part of the UV light into the blue light having the wavelength in the range of about 430 nm to about 470 nm, a part of the UV light into the green light having the wavelength in the range of about 520 nm to about 560 nm, and a part of the UV light into the red light having the wavelength in the range of about 630 nm to about 660 nm.

Therefore, the white light may be generated by the light passing through the wavelength conversion member 400 and the lights converted by the wavelength conversion member 400. In other words, the white light can be incident into the light guide plate 200 through the combination of the blue light, the green light and the red right.

As shown in FIGS. 3 and 4, the wavelength conversion member 400 includes a tube 410, a pre-treatment layer 421, a sealing part 420, a plurality of wavelength conversion particles 430, and a host 440.

The tube 410 receives the wavelength conversion particles 430 and the host 440 therein. That is, the tube 410 may serve as a receptacle to receive the wavelength conversion particles 430 and the host 440. In addition, the tube 410 extends with a long length in one direction.

Both end portions of the tube 410 are sealed. One end portion of the tube 410 is sealed by the sealing part 420. The tube 410 surrounds the wavelength conversion particles 430 and the host 440. The tube 410 receives the wavelength conversion particles 430 and the host 440. In other words, the tube 410 has an empty space therein, and receives the wavelength conversion particles 430 and the host 440 in the empty space thereof. The tube 410 is a receiving part to receive the wavelength conversion particles 430.

The tube 410 has a shape extending in one direction. The tube 410 may have a pipe shape. The tube 410 may have a pipe shape. In other words, a section of the tube 410, which is vertical to the length direction of the tube 410, may have the rectangular shape. The tube 410 may have a width of about 0.6 mm and a height of about 0.2 mm. The tube 410 may include a capillary tube.

The tube 410 is transparent. The tube 410 may include glass. In detail, the tube 410 may include a glass capillary tube.

The pre-treatment layer 421 may be provided on at least one surface of the tube 410. In more detail, the pre-treatment layer 421 may be provided on a portion of a surface of the tube 410 or the whole surface of the tube 410. In addition, the pre-treatment layer 421 may be provided on an inner surface of the tube 410.

The pre-treatment layer 421 may be interposed between the sealing part 420 and an inner surface of the tube 410. The pre-treatment layer 421 may be provided at the inlet of the tube 410. In addition, the pre-treatment layer 421 may be provided on an outer surface of the tube 410. In other words, the pre-treatment layer 421 may be coated on inner and outer surfaces of the inlet 411 of the tube 410. In addition, the pre-treatment layer 421 may directly make contact with the sealing part 420 and the tube 410.

In addition, as shown in FIG. 5, the pre-treatment layer 421 may be formed on the entire portions of the inner and outer surfaces of the tube 410. Therefore, the pretreatment layer 421 may be interposed between the inner surface of the tube 410 and the host 440.

The pre-treatment layer 421 may provide improved adhesive strength to the sealing part 420 and the tube 410. Therefore, the pre-treatment layer 421 can improve the adhesive strength and the sealing strength between the sealing part 420 and the tube 410. In other words, the pre-treatment layer 421 may include a buffer layer serving as a buffer between the sealing part 420 and the tube 410.

The pre-treatment layer 421 and the tube 410 may be chemically bonded to each other. In addition, the pre-treatment layer 421 may have the same surface characteristics as those of the sealing part 420. For example, both of the pre-treatment layer 421 and the sealing part 420 may have hydrophilicity or hydrophobicity. Accordingly, the sealing part 420 can effectively seal the tube 410 through the pre-treatment layer 421.

The pre-treatment layer 421 may include organic material. The pre-treatment layer 421 may include a substituted silane or an unsubstituted silane. In more detail, the pre-treatment layer 421 may include an epoxy substituted silane or an amino substituted. In other words, the pre-treatment layer 421 may include an epoxy silane or an amino silane.

The sealing part 420 is provided at one end portion of the tube 410. The sealing part 420 is provided in the tube 410. In more detail, the sealing part 420 is filled in an inlet 411 of the tube 410. In other words, the sealing part 420 may seal the inlet 411 of the tube 410. The sealing part 420 may seal the wavelength conversion particles 430 and the host 440 inside the tube 410.

The sealing part 420 is provided in the pre-treatment layer 421. The sealing part 420 directly makes contact with the pre-treatment layer 421. In more detail, the sealing part 420 may be chemically bonded to the pre-treatment layer 421.

The sealing part 420 may include organic material. The sealing part 420 may include phenol resin, urea resin, melamine resin, acrylic resin, epoxy resin, or silicon resin.

The wavelength conversion particles 430 are provided in the tube 410. In detail, the wavelength conversion particles 430 are uniformly distributed in the host 440 installed in the tube 410.

The wavelength conversion particles 430 convert the wavelength of the light emitted from the light emitting diodes 300. The wavelength conversion particles 430 receive the light emitted from the light emitting diodes 300 and convert the wavelength of the light. For instance, the wavelength conversion particles 430 can convert the blue light emitted from the light emitting diodes 300 into the green light and the red light. That is, a part of the wavelength conversion particles 430 converts the blue light into the green light having the wavelength band in the range of about 520 nm to about 560 nm and a part of the wavelength conversion particles 430 converts the blue light into the red light having the wavelength band in the range of about 630 nm to about 660 nm.

In addition, the wavelength conversion particles 430 can convert the UV light emitted from the light emitting diodes 300 into the blue light, the green light and the red light. That is, a part of the wavelength conversion particles 430 converts the UV light into the blue light having the wavelength band in the range of about 430 nm to about 470 nm, and a part of the wavelength conversion particles 430 converts the UV light into the green light having the wavelength band in the range of about 520 nm to about 560 nm. Further, a part of the wavelength conversion particles 430 converts the UV light into the red light having the wavelength band in the range of about 630 nm to about 660 nm.

In other words, if the light emitting diodes 300 are blue light emitting diodes that emit the blue light, the wavelength conversion particles 430 capable of converting the blue light into the green light and the red light may be employed. In addition, if the light emitting diodes 300 are UV light emitting diodes that emit the UV light, the wavelength conversion particles 430 capable of converting the UV light into the blue light, the green light and the red light may be employed.

The wavelength conversion particles 430 may include a plurality of quantum dots. The quantum dots may include core nano-crystals and shell nano-crystals surrounding the core nano-crystals. In addition, the quantum dots may include organic ligands bonded to the shell nano-crystals. Further, the quantum dots may include an organic coating layer surrounding the shell nano-crystals.

The shell nano-crystals can be prepared as at least two layers. The shell nano-crystals are formed on the surface of the core nano-crystals. The quantum dots lengthen the wavelength of the light incident into the core nano-crystals by using the shell nano-crystals forming a shell layer, thereby improving the light efficiency.

The quantum dots may include at least one of a group-II compound semiconductor, a group-III compound semiconductor, a group-V compound semiconductor, and a group-VI compound semiconductor. In more detail, the core nano-crystals may include CdSe, InGaP, CdTe, CdS, ZnSe, ZnTe, ZnS, HgTe or HgS. In addition, the shell nano-crystals may include CuZnS, CdSe, CdTe, CdS, ZnSe, ZnTe, ZnS, HgTe or HgS. The quantum dot may have a diameter of about 1 nm to about 10 nm.

The wavelength of the light emitted from the quantum dots can be adjusted according to the size of the quantum dot or the molar ratio between the molecular cluster compound and the nano-particle precursor in the synthesis process. The organic ligand may include pyridine, mercapto alcohol, thiol, phosphine and phosphine oxide. The organic ligand may stabilize the unstable quantum dots after the synthesis process. Dangling bonds may be formed at the valence band and the quantum dots may be unstable due to the dangling bonds. However, since one end of the organic ligand is the non-bonding state, one end of the organic ligand is bonded with the dangling bonds, thereby stabilizing the quantum dots.

In particular, if the size of the quantum dot is smaller than the Bohr radius of an exciton, which consists of an electron and a hole excited by light and electricity, the quantum confinement effect may occur, so that the quantum dot may have the discrete energy level. Thus, the size of the energy gap is changed. In addition, the charges are confined within the quantum dot, so that the light emitting efficiency can be improved.

Different from general fluorescent pigments, the fluorescent wavelength of the quantum dot may vary depending on the size of the particles. In detail, the light has the shorter wavelength as the size of the particle is reduced, so that the fluorescent light having the wavelength band of visible ray can be generated by adjusting the size of the particles. In addition, the quantum dot represents the extinction coefficient which is 100 to 1000 times higher than that of the general fluorescent pigment and has the superior quantum yield as compared with the general fluorescent pigment, so that strong fluorescent light can be generated.

The quantum dots can be synthesized through the chemical wet scheme. The chemical wet scheme is to grow the particles by immersing the precursor material in the organic solvent. According to the chemical wet scheme, the quantum dots can be synthesized.

The host 440 surrounds the wavelength conversion particles 430. In other words, the wavelength conversion particles 430 are uniformly distributed in the host 440. The host 440 includes polymer. The host 440 is transparent. That is, the host 440 includes transparent polymer.

The host 440 is disposed in the tube 410. In detail, the host 440 is fully filled in the tube 410. The host 440 may adhere to an inner surface of the tube 410.

The host 440 may include a photo-curable resin. The host 440 may include silicon-based resin, epoxy-based resin, or acrylic-based resin.

An air layer 450 is formed between the sealing part 420 and the host 440. The air layer 450 is filled with nitrogen. The air layer 450 performs the damping function between the sealing part 420 and the host 440.

The host 440 may have a surface characteristic different from that of the pretreatment layer 421. In more detail, the host 440 may have a first surface characteristic, and the pre-treatment layer 421 may have a second surface characteristic. In addition, the inner surface of the tube 410 may have the same surface characteristic as that of the host 440. In addition, the sealing part 420 may have the same surface characteristic as that of the pre-treatment layer 421.

For example, the host 440 and the inner surface of the tube 410 may have hydrophobicity, and the pre-treatment layer 421 and the sealing part 420 may have hydrophilicity. In contrast, the host 440 and the inner surface of the tube 410 have hydrophilicity, and the pre-treatment layer 421 and the sealing part 420 may have hydrophobicity.

In more detail, the host 440 may include various resins according to the characteristics of the wavelength conversion particles 430. In other words, the resin constituting the host 440 may be selected to maximize the characteristics of the wavelength conversion particles 430. Accordingly, the resin type constituting the host 440 may be determined according to the wavelength conversion particles 430, in more detail, according to core nano-crystals, shell nano-crystals, or the type of the ligand. Therefore, the host 440 may have hydrophilicity or the hydrophobicity.

If the host 440 has hydrophilicity, the pre-treatment layer 421 may have hydrophobicity. Accordingly, resin used as the pre-treatment layer 421 may include a hydrophobic group. In addition, the sealing part 420 may have hydrophobicity. Therefore, resin used as the sealing part 420 may include a hydrophobic group.

If the host 440 has hydrophobicity, the pre-treatment layer 421 may have hydrophilicity. Therefore, resin used as the pre-treatment layer 421 may include a hydrophilic group. In addition, the sealing part 420 may have hydrophilicity. Therefore, resin used as the sealing part 420 may include a hydrophilic group.

The hydrophilic group has affinity with water molecules. The hydrophilic group may have —OH, $NH_2$, —COOH, —$OSO_3H$ or —$OPO_3H_2$. The hydrophobic group is a functional group representing repellence with respect to water. The hydrophobic group may include a chain-shaped hydrocarbon group, an aromatic hydrocarbon group, an alkyl halide group, or an organic silicon group.

The wavelength conversion member 400 may be formed through the following scheme.

Figure 6:
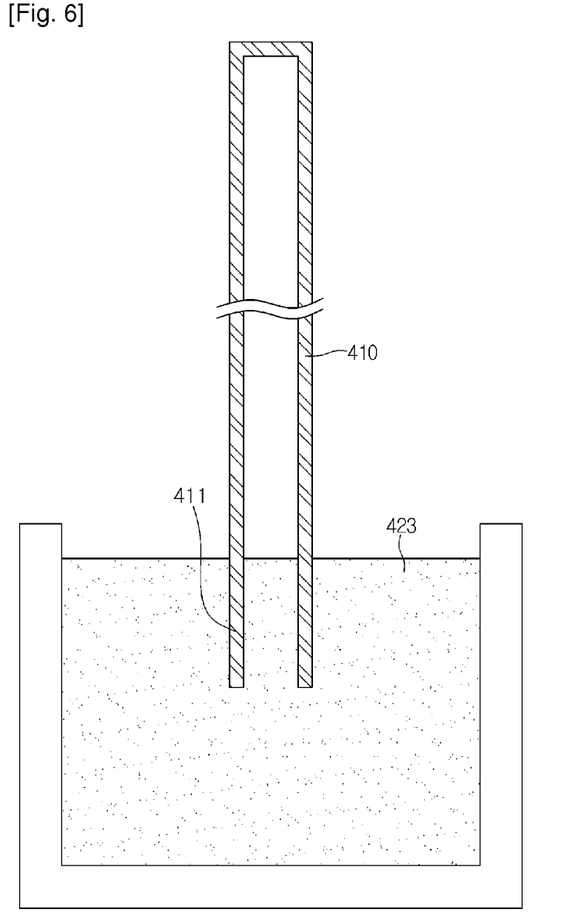
FIGS. 6 to 11 are sectional views showing a method of fabricating the wavelength conversion member according to the embodiment.

Referring to FIG. 6, in order to form the pre-treatment layer 421 at the inlet of the tube 410, the first resin composition 423 is coated. The first resin composition 423 may include a substituted silane or an unsubstituted silane.

In more detail, the first resin composition 423 may include a substituted or unsubstituted epoxy silane or a substituted or unsubstituted amino silane.

The first resin composition 423 may have hydrophilicity or hydrophobicity according to the characteristics of the second resin composition 440a used to form the host 440 thereafter. In other words, if the second resin composition 440a has hydrophilicity, the first resin composition 423 has a hydrophobic group. In contrast, if the second resin composition 440a has hydrophobicity, the first resin composition 423 may have a hydrophilic group.

Figure 7:
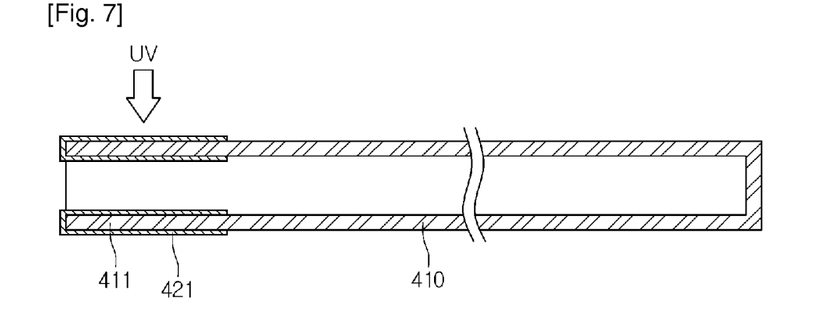

Referring to FIG. 7, the first resin composition 423 coated on the inlet of the tube 410 is cured by UV light and/or heat. Therefore, the pre-treatment layer 421 is formed on the inner and outer surfaces of the inlet of the tube 410.

Figure 8:
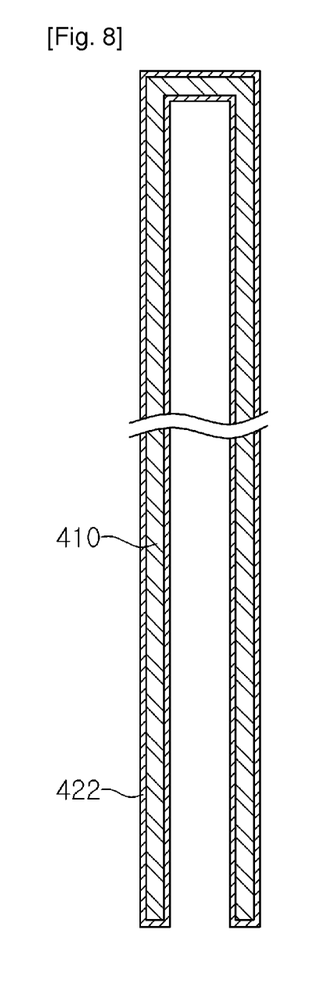

In addition, referring to FIG. 8, the pre-treatment layer 421 may be formed on the entire portion of the inner and outer surfaces of the tube 410. The pre-treatment layer 421 may be formed through a vacuum deposition process such as an evaporation scheme or a chemical vapor deposition process. In more detail, a substituted or unsubstituted epoxy silane or a substituted or unsubstituted amino silane is evaporated, so that the pre-treatment layer 421 may be formed on the tube 410.

Figure 9:
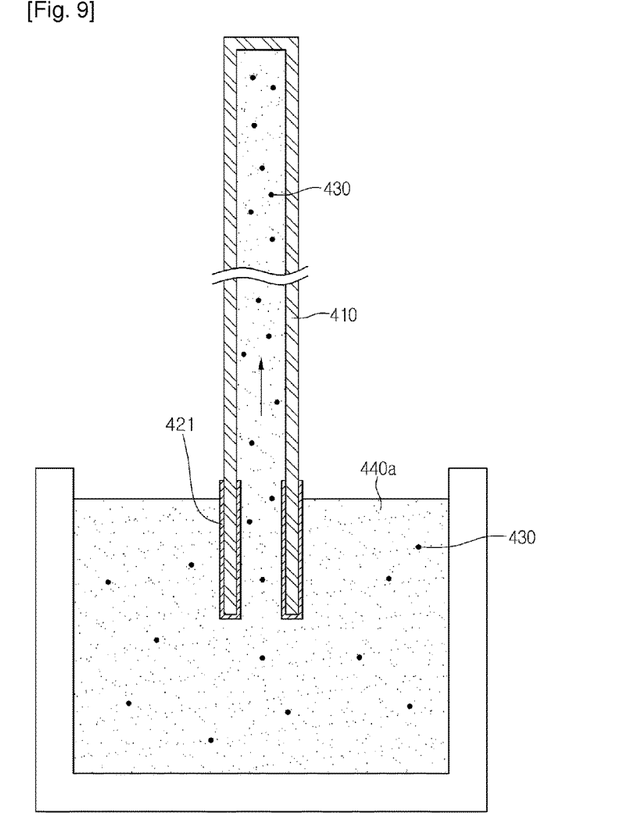

Referring to FIG. 9, the wavelength conversion particles 430 are uniformly distributed in the second resin composition 440a. The second resin composition 440a is transparent. The second resin composition 440a may have a photo-curable property.

Then, internal pressure of the tube 410 is reduced, an inlet of the tube 410 is immersed in second the resin composition 440a in which the wavelength conversion particles 430 are distributed, and ambient pressure is increased. Thus, the second resin composition 440a having the wavelength conversion particles 430 are introduced into the tube 410.

Figure 10:
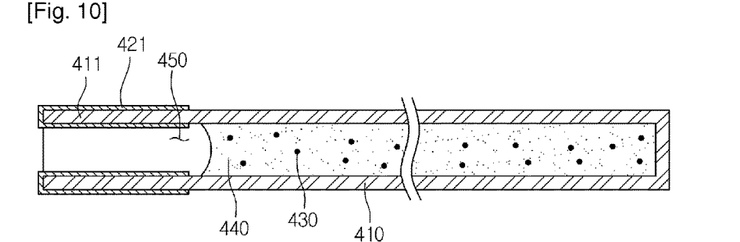

Referring to FIG. 10, a portion of the second resin composition 440a introduced into the tube 410 is removed, and the inlet 411 of the tube 410 becomes in an empty state.

In this case, since the second resin composition 440a has a surface characteristic different from that of the pre-treatment layer 421. The second resin composition 440a does not remain in the inlet of the tube 410. In other words, if the second resin composition 440a has hydrophilicity, the pre-treatment layer 421 has hydrophobicity. If the second resin composition 440a has hydrophobicity, the pre-treatment layer 421 has hydrophilicity.

Therefore, the second resin composition 440a at the inlet of the tube 410 may be easily and clearly removed. Therefore, the second resin composition 440a does not remain on the pre-treatment layer 421 at the inlet of the tube 410.

Thereafter, the resin composition 440a introduced into the tube 410 is cured by the UV light, thereby forming the host 440.

Figure 11:
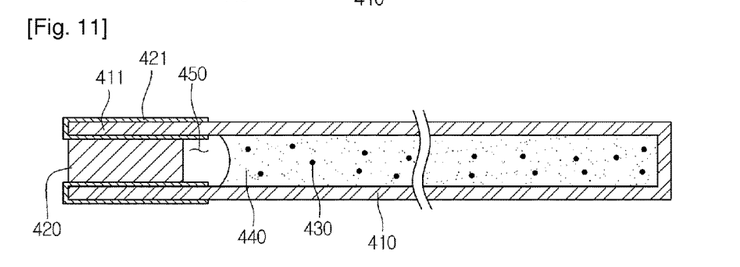

Referring to FIG. 11, the sealing part 420 is formed at the inlet 411 of the tube 410. In order to form the sealing part 420, the third resin composition is introduced into the inlet of the tube 410. The third resin composition may have the same characteristic as that of the pre-treatment layer 421. In other words, if the pre-treatment layer 421 has hydrophilicity, the third resin composition may have hydrophilicity. In addition, if the pre-treatment layer 421 has hydrophobicity, the third resin composition may have hydrophobicity.

Thereafter, the third resin composition introduced into the inlet of the tube 410 is cured by UV light and/or heat, thereby forming the sealing part 420.

The process of forming the sealing part 420 is performed under a nitrogen atmosphere. Accordingly, an air layer 450 including nitrogen may be formed between the sealing part 420 and the host 440.

Referring to FIGS. 1 and 2, the optical sheets 500 are provided on the light guide plate 200. The optical sheets 500 improve the characteristics of the light passing through the optical sheets 500.

The FPCB 600 is electrically connected to the light emitting diodes 300. The FPCB 600 may mount the light emitting diodes 300 thereon. The FPCB 600 is installed in the mold frame 10 and arranged on the light guide plate 200.

The backlight unit is constructed by using the mold frame 10 and the backlight assembly 20. In other words, the backlight unit includes the mold frame 10 and the backlight assembly 20.

The liquid crystal panel 30 is provided inside the mold frame 10, and provided on the optical sheets 500.

The liquid crystal panel 30 displays images by adjusting intensity of the light passing through the liquid crystal panel 30. That is, the liquid crystal panel 30 is a display panel to display the images. In more detail, the liquid crystal panel 30 displays an image by using light having a wavelength converted by the wavelength conversion member 400.

The liquid crystal panel 30 includes a TFT substrate, a color filter substrate, a liquid crystal layer interposed between the above two substrates and polarizing filters.

As described above, since the pre-treatment layer 421 has a surface characteristic different from that of the host 440, the second resin composition 440a does not remain at the inlet of the tube 410 when forming the host 440.

Therefore, the sealing part 420 may be firmly bonded to the pre-treatment layer 421. In particular, since the sealing part 420 has the same surface characteristic as that of the pre-treatment layer 421, the sealing part 420 and the pre-treatment layer 421 can be firmly bonded to each other.

In addition, the pre-treatment layer 421 is coated on the inner and outer surfaces of the inlet of the tube 410. Therefore, the pre-treatment layer 421 and the inlet of the tube 410 may make contact with each other at a wide area.

Accordingly, the sealing part 420 and the pre-treatment layer 421 can firmly seal the inner part of the tube 410.

Accordingly, the wavelength conversion particles 430 are prevented from being damaged due to external moisture and external oxygen. Accordingly, the wavelength conversion member 400 can effectively protect the wavelength conversion particles 430 from external chemical impact.

Therefore, the liquid crystal display according to the embodiment can represent improved reliability and improved chemical resistance.

Figure 12:
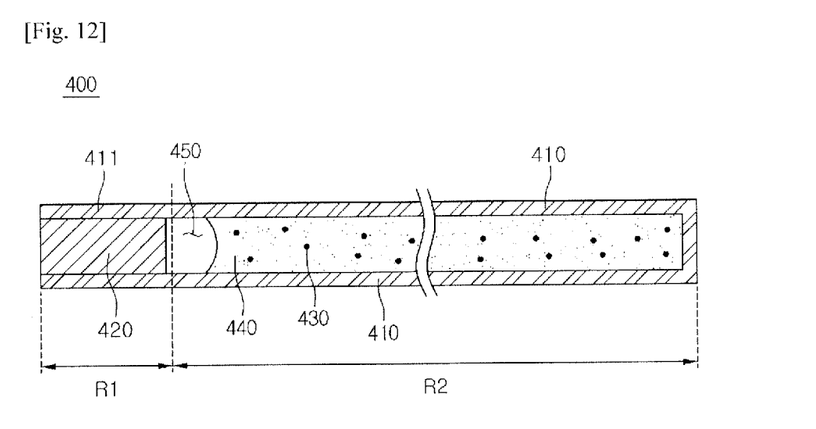
FIG. 12 is a sectional view showing a wavelength conversion member according to a second embodiment.
Figure 13:
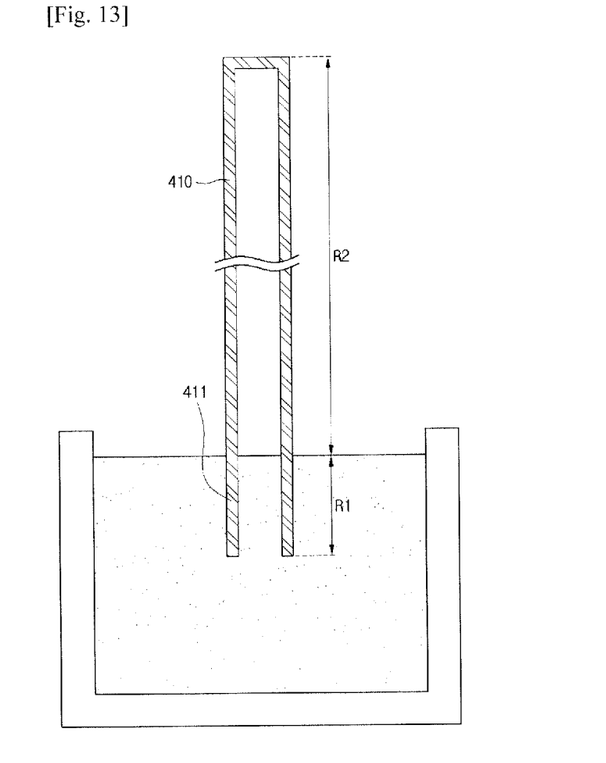
FIGS. 13 to 15 are sectional views showing the manufacturing procedure of a wavelength conversion member according to the second embodiment.
Figure 14:
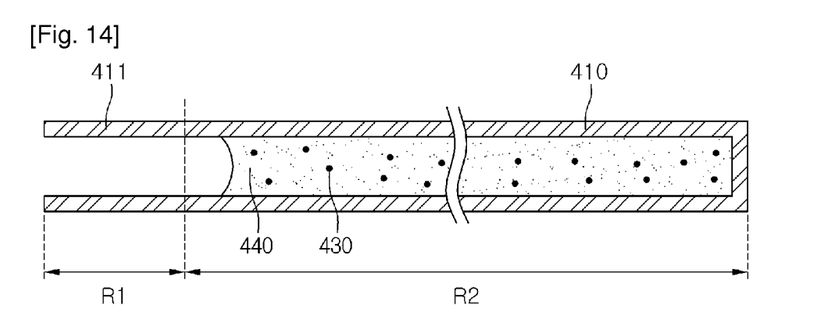
Figure 15:
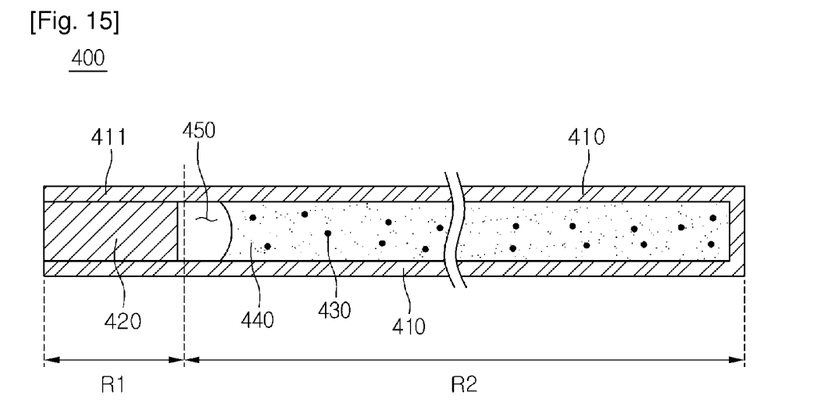

FIG. 12 is a sectional view showing a wavelength conversion member according to a second embodiment. FIGS. 13 to 15 are sectional views showing the wavelength conversion member according to the second embodiment. Hereinafter, the present embodiment will be described by making reference to the description of the previous embodiment, and the additional description of the tube will be made. In other words, the description of the previous embodiment may be incorporated in the description of the present embodiment except for modifications.

Referring to FIG. 12, the tube 410 includes first and second regions R1 and R2. The first region R1 may be the inlet of the tube 410. In addition, the second region R2 may be an inner part of the tube 410. In more detail, the first region R1 may be one end portion of the tube 410. The second region R2 may extend from a region adjacent to the first region R1 to an opposite end of the tube 410. In other words, the second region R2 may be a remaining region except for the inlet of the tube 410.

The first and second regions R1 and R2 may have surface characteristics different from each other. In other words, the first region R1 has the first surface characteristic, and the second region R2 may have the second surface characteristic. In more detail, the inner surface of the first region R1 may have the first surface characteristic, and the inner surface of the second region R2 may have the second surface characteristic. In more detail, if the first region R1 has hydrophobicity, the second region R2 may have hydrophilicity. In addition, if the first region R1 has hydrophilicity, the second region R2 may have hydrophobicity.

The host 440 is provided in the second region R2. The host 440 may directly make contact with the second region R2. The host 440 may be provided only in the second region R2.

In addition, the host 440 may have the same surface characteristic as that of the second region R2. In other words, the host 440 may have the second surface characteristic. Therefore, the first region R1 may have a surface characteristic different from that of the host 440. In other words, if the host 440 has hydrophilicity, the first region R1 may have hydrophobicity. In addition, if the host 440 has hydrophobicity, the first region R1 may have hydrophilicity.

The sealing part 420 may directly make contact with the tube 410. In more detail, the sealing part 420 is provided in the first region R1. The sealing part 420 may directly make contact with the inner surface of the first region R1.

The sealing part 420 may have the same surface characteristic as that of the first region R1. In other words, the sealing part 420 may have the first surface characteristic. In other words, if the first region R1 has hydrophobicity, the sealing part 420 may have hydrophobicity. In addition, if the first region R1 has hydrophilicity, the sealing part 420 may have hydrophilicity.

The wavelength conversion member 400 according to the present embodiment may be formed through the following scheme.

Referring to FIG. 13, the inlet of the tube 410 is dipped into a surface treatment solution so that the inlet of the tube 410 can be subject to the surface treatment. Therefore, the inner and outer surfaces of the inlet of the tube 410 are modified so that the inner and outer surfaces of the inlet of the tube 410 have a surface characteristic different from that of the other region of the tube 410. In other words, the inlet of the tube 410 may be modified so that the inlet of the tube 410 may have hydrophilicity or hydrophobicity.

For example, if the tube 410 includes glass, in more detail, is made of glass, the surface treatment solution may include hexa methyl di silazane (HMDS) or ammonium fluoride. Therefore, the inlet of the tube 410 may have hydrophobicity.

Referring to FIG. 14, the tube 410 is cleaned, and the second resin composition 440a is injected into the tube 410. Thereafter, the second resin composition 440a of the inlet of the tube 410 is removed. In this case, the first region R1 is modified so that the first region R1 has a surface characteristic different from that of the second resin composition 440a. Accordingly, the second resin composition 440a does not remain in the first region R1.

Thereafter, the host 440 is formed in the tube 410 by curing the second resin composition 440a.

Referring to FIG. 15, the sealing part 420 is formed in the inlet of the tube 410. In order to form the sealing part 420, the third resin composition is injected into the inlet of the tube 410. The sealing part 420 is formed by curing the third resin composition. Since the sealing part 420 has a surface characteristic the same as that of the first region R1, the sealing part 420 can be firmly bonded to the inner surface of the tube 410.

As described above, since the first region R1 has a surface characteristic different from that of the host 440, residues does not exist between the sealing part 420 and the tube 410. In addition, since the sealing part 420 is strongly bonded to the first region R1, the sealing part 420 and the tube 410 represent an improved sealing characteristic. Therefore, the wavelength conversion member 400 according to the embodiment may represent improved reliability and improved durability.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A wavelength conversion member comprising:
 a tube;
 a host in the tube; and
 a plurality of quantum dots in the host;
 wherein the tube comprises:
 a first distal end;
 a second distal end opposite to the first distal end;
 a first tube portion;
 a second tube portion adjacent to the first tube portion; and
 a midpoint between the first distal end and the second distal end along a first direction that is parallel to a central longitudinal axis of the tube,
 wherein the first tube portion extends from the first distal end to the midpoint and comprises the air layer and a portion of the host,
 wherein the second tube portion extends from the midpoint to the second distal end and comprises a portion of the host,
 wherein the mass of the portion of the host of the first tube portion is smaller than the mass of the portion of the host of the second tube portion,
 wherein a portion of the first tube portion has a first surface characteristic, and the second tube portion has a second surface characteristic,
 wherein the first and second surface characteristics include hydrophilicity or hydrophobicity, and
 wherein the first surface characteristic is different from the second surface characteristic.

2. The wavelength conversion member of claim 1, wherein the first surface characteristic is hydrophobicity.

3. The wavelength conversion member of claim 2, wherein the first tube portion further comprises a first sealing portion positioned at an inlet of the tube.

4. The wavelength conversion member of claim 3, wherein the first tube portion further comprises a pre-treatment layer interposed between the sealing portion and a surface of the host in contact with the air layer.

5. The wavelength conversion member of claim 4, wherein the pre-treatment layer corresponds to the portion of the first tube portion and is in direct contact with the air layer in the first tube portion.

6. The wavelength conversion member of claim 5, wherein the air layer is in direct contact with the host in the first tube portion.

7. The wavelength conversion member of claim 3, wherein the sealing portion seals the first tube portion and comprises a material different from the tube.

8. The wavelength conversion member of claim 3, wherein the second tube portion further comprises a second sealing portion.

9. The wavelength conversion member of claim 8, wherein a length of the second sealing portion, taken in the first direction, is less than that of the first sealing portion, taken in the first direction.

10. The wavelength conversion member of claim 1, wherein the tube includes glass.

11. A display device comprising:
a frame;
a backlight assembly on the frame; and
a liquid crystal panel on the backlight assembly;
wherein the backlight assembly comprises:
a reflective sheet;
a light guide plate on the reflective sheet;
an optical sheet on the light guide plate; and
a light source disposed at an incident surface of the light guide plate;
wherein the wavelength conversion member comprises:
a tube;
a host in the tube;
an air layer in the tube; and
a plurality of quantum dots in the host;
wherein the tube comprises:
a first distal end;
a second distal end opposite to the first distal end;
a first tube portion;
a second tube portion adjacent to the first tube portion; and
a midpoint between the first distal end and the second distal end along a first direction that is parallel to a central longitudinal axis of the tube,
wherein the first tube portion extends from the first distal end to the midpoint and comprises the air layer and a portion of the host,
wherein the second tube portion extends from the midpoint to the second distal end and comprises a portion of the host,
wherein the mass of the portion of the host of the first tube portion is smaller than the mass of the portion of the host of the second tube portion,
wherein a portion of the first tube portion has a first surface characteristic, and the second tube portion has a second surface characteristic,
wherein the first and second surface characteristics include hydrophilicity or hydrophobicity, and
wherein the first surface characteristic is different from the second surface characteristic.

12. The display device of claim 11, wherein the first surface characteristic is hydrophobicity.

13. The display device of claim 12, wherein the first tube portion further comprises first sealing portion positioned at an inlet of the tube.

14. The display device of claim 13, wherein the sealing portion seals the first tube portion and comprises a material different from the tube.

15. The display device of claim 13, wherein the second tube portion further comprises a second sealing portion.

16. The display device of claim 15, wherein a length of the second sealing portion, taken in the first direction, is less than that of the first sealing portion, taken in the first direction.

17. The display device of claim 13, wherein the first tube portion further comprises a pre-treatment layer interposed between the sealing portion and a surface of the host in contact with the air layer.

18. The display device of claim 17, wherein the pre-treatment layer corresponds to the portion of the first tube portion and is in direct contact with the air layer in the first tube portion.

19. The display device of claim 18, wherein the air layer is in direct contact with the host in the first tube portion.

20. The display device of claim 11, wherein the tube includes glass.

* * * * *